Nov. 27, 1945.  A. Y. GUNTER  2,389,850
HEAT EXCHANGER
Filed June 3, 1943
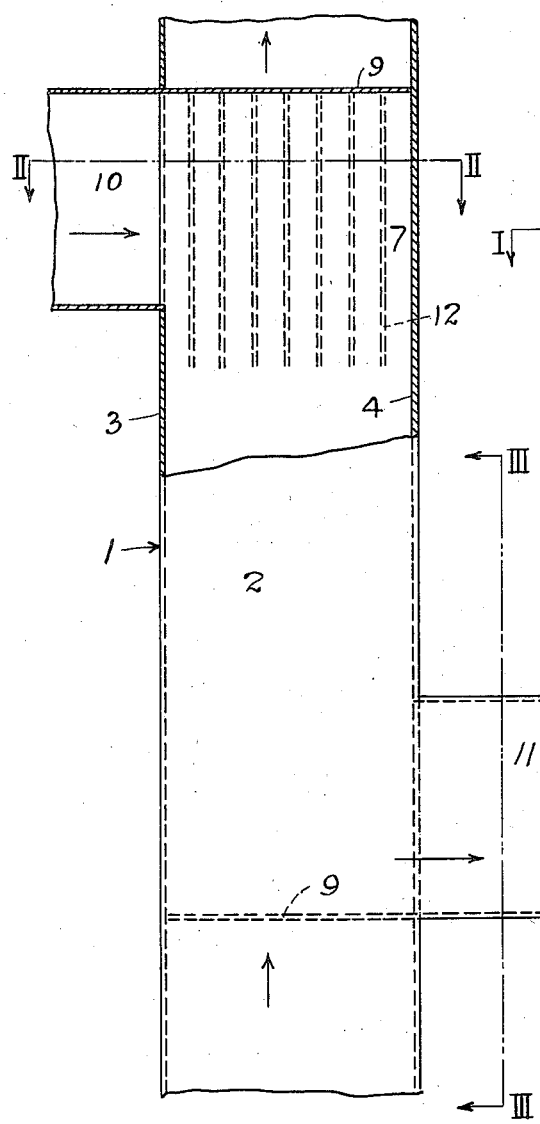
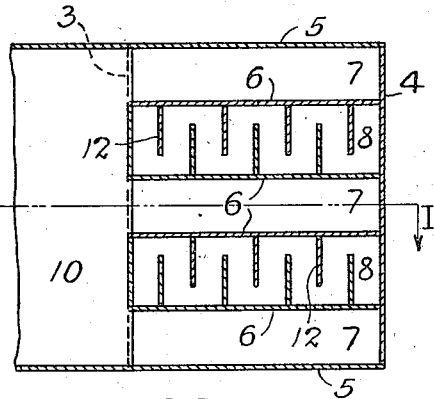
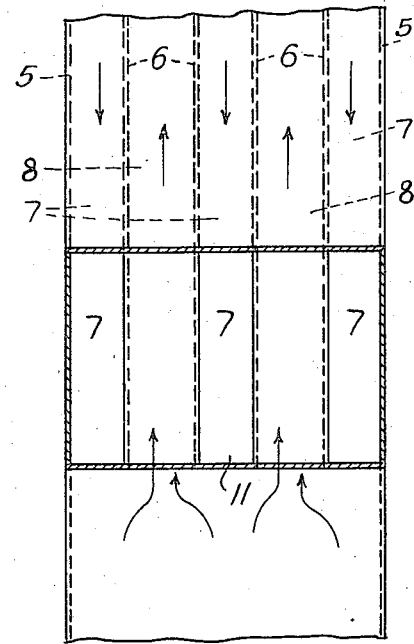
INVENTOR
Addison Y. Gunter
BY
S. C. Yeaton
ATTORNEY Patented Nov. 27, 1945

2,389,850

UNITED STATES PATENT OFFICE 2,389,850

HEAT EXCHANGER

Addison Y. Gunter, Larchmont, N. Y., assignor to American Locomotive Company, New York, N. Y., a corporation of New York Application June 3, 1943, Serial No. 489,452

2 Claims. (Cl. 257—245)

This invention relates to a heat exchanger and more particularly to an air preheater for heat exchange between cold air and hot flue gas.

Air preheaters for effecting heat exchange between cold air and hot flue gas are well known, the flue gas passing through passages separating air passages, the adjacent passages being separated by thin walls through which the heat exchange takes place.

In such conventional preheaters, which may be used for instance as air preheaters in furnace and boiler units, it is customary to have the air and flue gas in counterflow, so that the coldest air first comes in heat exchange relation with the coolest flue gas within the preheater. This results in the metal walls separating the air from the flue gas, at the flue gas outlet from the preheater, being at the lowest temperature, and therefore at this point, if sufficient heat exchange between the flue gas and the air is permitted, condensation of moisture in the flue gas passage takes place when the temperature of the metal drops below the moisture dew point of the flue gas. This condensation results in corrosion of the metal, due to the combination of moisture with the sulphur and nitrogen oxides present in the flue gas, which causes a loss in efficiency and in time will eat through the metal, causing air to flue gas leakage. Therefore there will be an increased maintenance cost due to the necessity of replacing corroded parts.

Another disadvantage of the low metal temperature of the flue gas passages is the condensation of tarry residues from the flue gas, these residues causing fouling of the transfer surfaces of the walls of the flue gas passages, the fouling preventing efficient heat transfer through the walls of the flue gas passages and obstructing the flow of the flue gas, causing an increase in flue gas pressure drop. Furthermore, the deposition of tarry residues increases the maintenance cost of the exchanger, as the tarry residues must be cleaned off periodically.

The present invention is directed to providing a heat exchanger adapted to prevent or minimize the aforesaid condensations with their accompanying undesirable results.

An object of the present invention is to provide a heat exchanger provided with means preventing or minimizing the condensation of one of the fluids passing therethrough.

A further object is to provide an exchanger as aforesaid adapted for use as a preheater of air by flue gas, said means effecting an increase in temperature of the walls of the flue gas passages at the flue gas outlet.

A further object is to provide an exchanger for preheating air by flue gas in which more heat is taken from the flue gas than has previously been found practical.

Referring to the drawing forming a part of this application, Figure 1 is a side view of the exchanger of the present invention, parts being broken away and the upper portion being shown in section on the line I—I of Fig. 2; Fig. 2 is a section on the line II—II of Fig. 1, parts being omitted; and Fig. 3 is a rear view of a portion of the exchanger shown in Fig. 1, the air outlet being shown in section on the line III—III of Fig. 1.

The heat exchanger shown in the drawing is of the plate type although other types may be employed. It is indicated generally by the reference numeral 1, and includes a rectangular shell 2 having a front wall 3, a rear wall 4 and side walls 5. Four longitudinally extending spaced vertical walls 6, formed of thin plates, also extending between the walls 3 and 4 and connected thereto, divide the shell into five passages, as is clearly shown in Fig. 2. The outermost and center passages 7 are for air, and the other two passages 8 are for flue gas as will presently appear.

The air passages 7 are closed at the top and bottom by walls 9, and open at the upper portion through openings in the wall 3 to an air inlet 10, which may open to the atmosphere, and at the lower portion through openings in the wall 4 to an air outlet 11, which may lead to a furnace air supply, for flow downward through the passages 7 of air to be preheated, the cold air entering the exchanger from the inlet 10.

The flue gas passages 8 are closed except at the top and bottom where they open through openings in the adjacent walls 9. The hottest flue gas enters the exchanger at the bottom and flows vertically upward, transferring a large part of its heat to the air through the walls 6. The air and flue gas flows are indicated in the drawing by arrows.

It will be understood that where the heat exchanger is used for preheating air for a furnace, the flue gas passages will be connected at their bottom with the flue gas outlet of the furnace, and will be connected at their top with a smoke stack or the like, in the usual manner, the walls 3, 4 and 5 being extended beyond the plates 9 to indicate this, the plates 9 indicating the top and bottom of the heat exchanger.

The heat exchanger as thus described is substantially conventional. In such a conventional heat exchanger the flue gases cool as they pass upward through the exchanger, reaching such a low temperature at the upper portion thereof that the incoming cold air from the inlet 10 cools the flue gas confining walls at this upper portion to an extent to cause flue gas condensations thereon. These condensations cause the aforedescribed undesirable corrosion and deposition of tarry residues upon the metal walls of the flue gas passage.

The present invention is directed toward providing means for increasing the temperature of the walls 6 adjacent the inlet 10, that is to say, adjacent the flue gas outlet, so that their temperature is above the dew point of the flue gas, to thereby prevent or minimize condensation of moisture, and also above the condensation point of tarry residues in the flue gas, to thereby prevent or minimize their deposition on the walls of the flue gas passages.

To accomplish the desired aforementioned results, extended surfaces, such for instance as the vertical plate fins 12, are secured to the walls 6 on the flue gas side thereof at the portion thereof adjacent the inlet 10, that is to say, adjacent the flue gas outlet, the approximate length of the fins being shown in Fig. 1. The fins start at their lowermost portion at the parts of walls 6 which would otherwise be cooled sufficiently to cause condensation, for instance the aforesaid condensation of tarry residues, this part in the exchanger I being below the inlet 10. The fins on opposite walls 6 of each flue gas passage are staggered as is clearly shown in Fig. 2. These fins provide additional heating surface on the flue gas side of walls 6, adjacent the inlet 10, and they transfer their heat to the portions of the walls of the flue gas passages containing the fins, raising the temperature of these portions on the flue gas side. Enough fins 12 are provided to raise the temperature above the moisture dew point of the flue gas and above the condensation point of the tarry residues in the flue gas.

The direct advantage of the use of fins or the like as aforedescribed is that more heat may be taken from the flue gas than in a conventional exchanger of a similar type. The conventional exchanger is made shorter so that the air inlet is nearer to the air outlet, the flue gas therefore being expelled from the exchanger at a sufficiently high temperature to prevent or minimize the aforesaid condensations. In the present invention the exchanger is made longer so that there is greater heat transfer, but this necessitates the air inlet being located at a cooler flue gas heat zone, which would result in cooling the walls of the flue gas passages at this cooler flue gas heat zone by the incoming cold air to a condensation point were it not for the provision of the fins. These, as aforesaid, increase the heat exchange from the flue gas to the walls, raising the temperature of the walls sufficiently to prevent or minimize condensation.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A heat exchanger for heating a supply of air for a furnace firebox comprising a rectangular shell; thin heat transfer plates separating said shell into a plurality of separate passages, one of said passages being a flue gas passage open at the bottom for communication with the flue of the furnace for the passage of flue gas therefrom through said flue gas passage, and open at the top for exit of said flue gas, and other of said passages being air passages adjacent and on opposite sides of said flue gas passage and separated therefrom by said thin plates for heat transfer from said gas to said air, each of said air passages having an air inlet at its upper end, and an air outlet at its lower end for communication with said firebox, said thin plates being bare on their air passage faces; and transversely spaced longitudinally extending fin-like members disposed on the flue gas passage faces of said plates whereby said plates are provided with a greater heat transfer surface in said flue gas passage than in said air passages, said fin-like members being disposed only at that portion of said plates adjacent said air inlets and projecting into said flue gas passage from the faces of said plate portions therein providing thereby a greater heat transfer surface on the flue gas side of said plate portions than on the opposite side of said plate portions in said air passages, thereby tending to prevent harmful flue gas condensation.

2. A heat exchanger for heating a supply of air for a furnace firebox comprising a shell; thin heat transfer plates separating said shell into a plurality of separate passages, one of said passages being a flue gas passage having an inlet opening at one end for communication with the flue of the furnace for the passage of flue gas therefrom through said flue gas passage, and open at its opposite end for exit of said flue gas, and other of said passages being air passages adjacent and on opposite sides of said flue gas passage and separated therefrom by said thin plates for heat transfer from said gas to said air, each of said air passages having an air inlet at its end remote from said flue gas passage inlet, and an air outlet at its opposite end for communication with said firebox, said air and flue gas being in counterflow, said thin plates being bare on their air passage faces; and transversely spaced longitudinally extending fin-like members disposed on the flue gas passage faces of said plates whereby said plates are provided with a greater heat transfer surface in said flue gas passage than in said air passages, said fin-like members being disposed only at that portion of said plates adjacent said air inlets and projecting into said flue gas passage from the faces of said plate portions therein providing thereby a greater heat transfer surface on the flue gas side of said plate portions than on the opposite side of said plate portions in said air passages, thereby tending to prevent harmful flue gas condensation.

ADDISON Y. GUNTER.